United States Patent
Qian

(10) Patent No.: US 9,416,968 B2
(45) Date of Patent: Aug. 16, 2016

(54) ENERGY-SAVING ELECTROSTATIC DUST COLLECTOR

(75) Inventor: Xuelue Qian, Shanghai (CN)

(73) Assignee: SHANGHAI FUBO EP EQUIPMENT CO., LTD, Shanghai (CN)

( * ) Notice: Subject to any disclaimer, the term of this patent is extended or adjusted under 35 U.S.C. 154(b) by 349 days.

(21) Appl. No.: 13/823,948

(22) PCT Filed: Jun. 23, 2011

(86) PCT No.: PCT/CN2011/076210
§ 371 (c)(1),
(2), (4) Date: Jun. 10, 2013

(87) PCT Pub. No.: WO2012/037828
PCT Pub. Date: Mar. 29, 2012

(65) Prior Publication Data
US 2013/0255500 A1 Oct. 3, 2013

(30) Foreign Application Priority Data

Sep. 21, 2010 (CN) ...................... 2010 2 0539491 U

(51) Int. Cl.
*F23J 15/02* (2006.01)
*F23J 15/06* (2006.01)

(52) U.S. Cl.
CPC ................ *F23J 15/02* (2013.01); *F23J 15/025* (2013.01); *F23J 15/06* (2013.01); *Y02E 20/363* (2013.01)

(58) Field of Classification Search
CPC combination set(s) only.
See application file for complete search history.

(56) References Cited

U.S. PATENT DOCUMENTS

| | | | |
|---|---|---|---|
| 3,966,435 A * | 6/1976 | Penney | 96/66 |
| 6,303,083 B1 * | 10/2001 | Johnson et al. | 422/171 |
| 7,022,296 B1 * | 4/2006 | Khang et al. | 423/210 |
| 7,481,987 B2 * | 1/2009 | Maziuk, Jr. | 423/215.5 |
| 7,531,154 B2 * | 5/2009 | Maziuk, Jr. | 423/243.01 |
| 8,302,388 B2 * | 11/2012 | Kobayashi et al. | 60/298 |
| 2007/0257122 A1* | 11/2007 | Shimada et al. | 237/12 |
| 2009/0053661 A1* | 2/2009 | Kinnunen | 431/7 |
| 2010/0071348 A1* | 3/2010 | Kobayashi et al. | 60/276 |

(Continued)

FOREIGN PATENT DOCUMENTS

| | | |
|---|---|---|
| CN | 2658693 Y | 11/2004 |
| CN | 200954421 Y | 10/2007 |
| CN | 101073744 A | 11/2007 |

(Continued)

OTHER PUBLICATIONS

Oct. 13, 2011 Search Report issued in International Patent Application No. PCT/CN2011/076210 (with translation).

*Primary Examiner* — Duane Smith
*Assistant Examiner* — Sonji Turner
(74) *Attorney, Agent, or Firm* — Oliff PLC

(57) ABSTRACT

An energy-saving dust collector includes a dust collection device (8) connected to a flue (1) and a fume afterheat recycling device (2) installed in the flue in the front of the dust collection device. The fume afterheat recycling device includes a heat exchanger. The heat exchanger includes a heat suction section (7) and a heat radiating section (3) connected with the heat suction section. The heat suction section is installed at a smoke inlet of the dust collection device, and the radiating section is connected with a condensation water tube. The energy-saving dust collector can reduce temperature of the smoke, improve dust collection efficiency, prevent the collector from corrosion of acid dew and prolong the service life of the collector.

7 Claims, 1 Drawing Sheet

(56) References Cited

U.S. PATENT DOCUMENTS

2010/0074817 A1\* 3/2010 Kobayashi et al. ........ 423/239.1
2011/0247360 A1\* 10/2011 Hasse et al. .................... 62/606

FOREIGN PATENT DOCUMENTS

CN 201819234 U 5/2011
JP 2000074488 A \* 3/2000 ................ F24H 1/10

\* cited by examiner

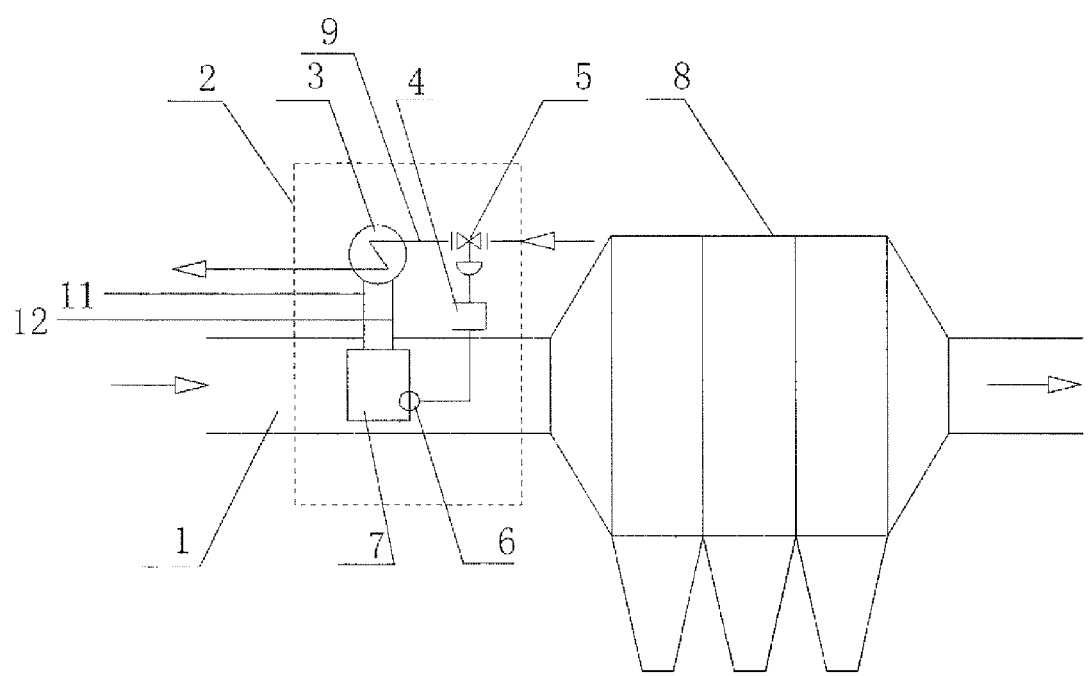

ENERGY-SAVING ELECTROSTATIC DUST COLLECTOR

BACKGROUND OF THE PRESENT INVENTION

1. Field of Invention

The present invention involves boiler flue gas dust removal technology, and an energy-saving electrostatic dust collector is put forward to increase the dust removal rate by lowering flue gas temperature.

2. Description of Related Arts

Flue gases discharged from a boiler contain $SO_3$ due to that coals burned in the boiler contain an S element. The $SO_3$ not only can form acid rain that pollutes the environment, but also can be condensed, together with water vapor in the flue gases, into a dew formation to corrode a device when the flue gas temperature is too low. Therefore, the flue gas temperature of a power plant boiler or of an industrial boiler is generally between 140° C. and 160° C. or even higher. The flue gas temperature has a relatively great impact on operating performance of an electrostatic dust collector. In one aspect, a volume of the flue gases increases with the increase of the flue gas temperature, and therefore a wind speed of an electric field also increases, thereby lowering dust collection efficiency. In another aspect, the increase of the flue gas temperature may lower a spark voltage, which is unfavorable for the dust collection. Apart from this, the level of the flue gas temperature also affects a fly ash resistivity directly. When the flue gas temperature is lowered, the fly ash resistivity decreases, and the dust collection efficiency is improved.

For a cloth bag dust collector, a material of a cloth bag filter is selected mainly according to a range of the flue gas temperature. Therefore, the flue gas temperature must be controlled strictly during use. The flue gas temperature is lowered into a temperature range that can be tolerated by the cloth bag filter for long-term operations. In a general heat exchange device, acid dew corrosion is incurred by direct heat exchange between flue gases and a working medium to be heated. Therefore, after being used, the device will definitely be corroded while the flue gas temperature at an inlet of the electrostatic dust collector is lowered. Thus, such an apparatus which not only can lower a flue gas temperature but also can avoid occurrence of acid dew is needed.

SUMMARY OF THE PRESENT INVENTION

An objective of the present invention is to provide an energy-saving electrostatic dust collector for lowering a flue gas temperature and improving dust collection efficiency to overcome the problem in the prior art.

The present invention adopts the following technical solution to solve the above problem.

The present invention provides an energy-saving electrostatic dust collector, which comprises an electrostatic dust collection device connected to a flue, and further comprises a fume afterheat recycling device disposed in the flue in front of the dust collection device. The fume afterheat recycling device comprises a heat exchanger. The heat exchanger comprises a heat absorption section and a heat radiating section connected to the heat absorption section, the heat absorption section being disposed at a flue gas inlet of the dust collection device, and the heat radiating section, being positioned higher than the heat absorption section, is connected to a condensed-water pipe.

According to the present invention, the flue gas temperature at the inlet of the electrostatic dust collection device can be controlled to be constant, which is controlled between T+10° C. and the air preheater outlet flue gas temperature Q, thereby the flue gas temperature can be lowered maximally to recycle the flue gas waste heat on the basis of avoiding acid dew corrosion.

According to the present invention, the heat absorption section and the heat radiating section of the heat exchanger are connected with each other through a vapor pipe 11 and a water return pipe 12, and the heat radiating section is positioned higher than the heat absorption section.

According to the present invention, an electric control valve is disposed on the condensed-water pipe connected to the heat radiating section, the electric control valve being connected to an automatic control apparatus.

According to the present invention, a temperature sensor is disposed on the heat absorption section, the temperature sensor being connected to the automatic control apparatus.

According to the present invention, the heat absorption section is formed by finned tubes containing working medium water.

According to the present invention, the electrostatic dust collection device comprises a plurality of dust collection electric fields.

According to the present invention, the heat absorption section and the heat radiating section of the heat exchanger are connected with each other through a vapor pipe and a water return pipe, and the heat radiating section is positioned higher than the heat absorption section.

Through the above technical solution, acid dew corrosion is prevented from occurring in the device by adding the heat exchanger to the energy-saving electrostatic dust collector of the present invention to absorb flue gas waste heat and lower the flue gas temperature and utilizing controllability and adjustability of the temperature of the apparatus wall, so that the electrostatic dust collection device can achieve a good running condition and the dust collection efficiency can be improved. For electric dust collection, the decrease of the flue gas temperature reduces a volume of the flue gases, and decreases the ash resistivity, thereby improving dust collection performance. If the flue gas temperature has a certain temperature decrease margin, efficiency of a dust collector with relatively more electric fields can be achieved by adopting a dust collector with relatively less electric fields, thereby reducing investment costs. For cloth bag dust collection, the decrease of the flue gas temperature may directly prolong the service life of the cloth bag, thereby lowering running costs.

BRIEF DESCRIPTION OF THE DRAWING

FIG. 1 is a structural view of an energy-saving electrostatic dust collector of the present invention.

DETAILED DESCRIPTION OF THE PREFERRED EMBODIMENT

As shown in FIG. 1, the present invention provides an energy-saving electrostatic dust collector, which includes an electrostatic dust collection device 8 and a fume afterheat recycling device 2 connected to a flue 1. The fume afterheat recycling device 2 is disposed in the flue at a segment in front of the dust collection device 8. The fume afterheat recycling device 2 includes a heat exchanger. The heat exchanger includes a heat absorption section 7 and a heat radiating section 3 connected to the heat absorption section. The heat absorption section 7 is disposed at a flue gas inlet of the dust collection device 8. The heat absorption section and the heat radiating section of the heat exchanger are connected through a vapor pipe 11 and a water return pipe 12. Moreover, the heat radiating section is positioned higher than the heat absorption section. The heat absorption section 7 is formed by a plurality of finned tubes containing working medium water. The finned tubes absorb heat of the flue gases to transform the water into water vapor, thereby lowering the temperature of the flue gases. The heat radiating section 3 is connected to a condensed-water pipe 9. In the heat radiating section 3, condensed water absorbs heat, resulting in transforming the water vapor, which is volatilized from the heat absorption section, into water and circulating the water back.

The present invention further includes an automatic control apparatus 4 for adjusting the flow of condensed water in the heat radiating section and the temperature of a wall surface of the heat absorption section. The automatic control apparatus 4 is connected via an electric control valve 5 to the condensed-water pipe 9, so as to be further connected to the heat radiating section 3 of the heat exchanger. The automatic control apparatus 4 measures a temperature of an inner wall of the heat absorption section 7 through a temperature sensor 6, and controls the flow of the condensed water in the condensed-water pipe 9, so as to control the temperature by adjusting the flow of the condensed water.

The flue gases first pass through the heat absorption section 7 of the heat exchanger. The heat exchanger absorbs waste heat of the flue gases to lower the flue gas temperature. The absorbed waste heat is transferred to circulating water of the heat exchanger or latent heat of the vapor. The heat carried in the circulating water or the latent heat of the vapor, after undergoing heat exchange with the condensed water in the heat radiating section 3, is further supplied to a wet-desulfurization flue gas reheating system, a condensed-water heating system, or a heating system which needs to use heat. When the temperature of the flue gases entering the electrostatic dust collector is too high (far higher than an acid dew point), the automatic control apparatus 4 adjusts the electric control valve 5 to increase a heat transfer amount of the heat radiating section 3, and a temperature and pressure of a heat transfer medium and the flue gases in the heat absorption section 7 increase with the increase of the heat transfer amount of the heat radiating section, so that heat transfer between the waste heat absorption section and the flue gases definitely increases, and therefore the flue gas temperature is lowered.

The flue gases are discharged from the boiler. At this time, it is generally required that the temperature of the flue gases is about 150° C., so that a heated surface at a tail portion of the boiler is not corroded by acid dew. For a boiler which runs for a relatively long time, the temperature is even higher. Then, the flue gases enter the heat absorption section of the heat exchanger. A wall temperature value T which is higher than a flue gas acid dew point is set through the automatic control apparatus. At this time, the flue gas temperature at an outlet of the heat absorption section, namely, the flue gas temperature at the inlet of the electrostatic dust collection device, is between T+10° C. and the flue gas temperature Q at the outlet of the air preheater. The value of the acid dew point T differs with a change of the fuel in the boiler. Generally, the value of T is about 100° C. The flue gas temperature at the inlet of the electrostatic dust collection device is adjusted automatically by controlling a condensed-water system through the automatic control apparatus, so as to be maintained at a constant value. Therefore, the running condition of the electrostatic dust collection device is between T+10° C. and Q. Thus, the present invention can recycle the flue gas waste heat and lower the flue gas temperature maximally on the basis avoiding acid dew corrosion, to greatly improve the dust collection efficiency of the electrostatic dust collector.

When the flue gas temperature is lowered, the dust collection efficiency of the electrostatic dust collector is improved, so that on the premise that the national emission standard is met, running of one or some of the dust collection electric fields may be stopped. For a new project, a degree of flue gas temperature reduction is taken into consideration during the design of a dust collection device. The number of electric fields can be reduced properly on the premise that the dust collection efficiency is satisfied, thereby saving investment costs.

What is claimed is:

1. An energy-saving dust collector, comprising a dust collection device connected to a flue and a fume afterheat recycling device disposed in the flue on a front of the dust collection device, the fume afterheat recycling device comprises a heat exchanger, and the heat exchanger comprises a heat absorption section and a heat radiating section connected to the heat absorption section, and the heat radiating section is positioned higher than the heat absorption section, the heat absorption section being disposed at a flue gas inlet of the dust collection device, the heat radiating section being connected to a condensed-water pipe, and a flue gas temperature at the flue gas inlet of the dust collection device is controllable and higher than an acid dew point T of the flue gas.

2. The energy-saving dust collector as in claim 1, wherein the condensed-water pipe, which is connected to the heat radiating section, is fitted with an electric control valve, the electric control valve being linked with an automatic control apparatus.

3. The energy-saving dust collector as in claim 2, wherein the heat absorption section is fitted with a temperature sensor, the temperature sensor being connected to the automatic control apparatus.

4. The energy-saving dust collector as in claim 1, wherein the heat absorption section comprises finned tubes containing working medium water.

5. The energy-saving dust collector as in claim 1, wherein the dust collection device comprises a plurality of dust collection electric fields.

6. The energy-saving dust collector as in claim 1, wherein the heat absorption section and the heat radiating section of the heat exchanger are connected with each other through a vapor pipe and a water return pipe.

7. The energy-saving dust collector as in claim 1, wherein the flue gas temperature at the flue gas inlet of the dust collection device is constant, which is controlled to be between T+10° C. and the flue gas temperature Q at an outlet of the air preheater.

* * * * *